United States Patent
Schuler et al.

(10) Patent No.: US 8,231,233 B2
(45) Date of Patent: Jul. 31, 2012

(54) PORTABLE ELECTRONIC DEVICE AND METHOD OF POWER MANAGEMENT FOR SAME TO ACCOMMODATE PROJECTOR OPERATION

(75) Inventors: Francesca Schuler, Des Plaines, IL (US); Krishna Jonnalagadda, Mason, OH (US)

(73) Assignee: Motorola Mobility, Inc., Libertyville, IL (US)

( * ) Notice: Subject to any disclaimer, the term of this patent is extended or adjusted under 35 U.S.C. 154(b) by 493 days.

(21) Appl. No.: 12/486,450

(22) Filed: Jun. 17, 2009

(65) Prior Publication Data

US 2010/0321647 A1 Dec. 23, 2010

(51) Int. Cl.
G03B 21/00 (2006.01)
G06F 1/26 (2006.01)
(52) U.S. Cl. ........................................ 353/121; 713/320
(58) Field of Classification Search .................. 353/94, 353/121; 370/311; 713/320
See application file for complete search history.

(56) References Cited

U.S. PATENT DOCUMENTS

| | | | |
|---|---|---|---|
| 6,184,875 B1 | 2/2001 | Matsuura | |
| 6,830,344 B2 | 12/2004 | Reho et al. | |
| 6,966,651 B2 | 11/2005 | Johnson | |
| 7,072,956 B2 | 7/2006 | Parupudi et al. | |
| 7,076,255 B2 | 7/2006 | Parupudi et al. | |
| 7,213,048 B1 | 5/2007 | Parupudi et al. | |
| 7,266,772 B2 | 9/2007 | Miyashita et al. | |
| 7,292,269 B2 | 11/2007 | Raskar et al. | |
| 7,292,588 B2 | 11/2007 | Milley et al. | |
| 7,293,071 B2 | 11/2007 | Sato et al. | |
| 7,306,339 B2 | 12/2007 | Kaufman et al. | |
| 7,309,134 B2 | 12/2007 | Cambron | |
| 7,310,085 B2 | 12/2007 | Holloway et al. | |
| 7,313,589 B2 | 12/2007 | Tran et al. | |
| 2003/0038928 A1* | 2/2003 | Alden | 353/122 |
| 2003/0158609 A1 | 8/2003 | Chlu | |
| 2005/0120200 A1 | 6/2005 | Brignone et al. | |
| 2005/0240786 A1 | 10/2005 | Ranganathan | |

(Continued)

FOREIGN PATENT DOCUMENTS

WO WO 2006/038714 A2 4/2006

OTHER PUBLICATIONS

Pingafi, et al., "Steerable Interface for Pervasive Computing Spaces," Proceedings of the First IEEE International Conference on Pervasive Computing and Communications, 2003 (PerCom 2003), Mar. 23-26, 2003, pp. 315-322.

(Continued)

Primary Examiner — Georgia Y Epps
Assistant Examiner — Danell L Owens

(57) ABSTRACT

A portable electronic device implements power management to accommodate operation of a projector from the device's power source. The portable device includes a power source, a memory, a user interface, and a processor. The memory stores an image file and associated content metadata. The user interface receives a request to use the projector to perform a projection task, wherein the task includes projecting images from the image file onto a display surface. The processor is operable to: (i) retrieve the content metadata from the memory responsive to the request; (ii) project, based at least on the content metadata, whether the power source has sufficient power remaining for the projector to complete the task; and (iii) if there is not sufficient power remaining, modify parameters associated with the task and/or functionality of the portable device in an attempt to enable the power source to supply sufficient power to the projector.

20 Claims, 4 Drawing Sheets

U.S. PATENT DOCUMENTS

| | | | |
|---|---|---|---|
| 2006/0103811 | A1 | 5/2006 | May et al. |
| 2007/0024580 | A1 | 2/2007 | Sands et al. |
| 2007/0177115 | A1* | 8/2007 | Yin et al. .................. 353/122 |
| 2008/0201587 | A1* | 8/2008 | Lee .............................. 713/320 |
| 2009/0006875 | A1 | 1/2009 | Varma et al. |
| 2009/0006878 | A1 | 1/2009 | Borghetti et al. |

OTHER PUBLICATIONS

Lewis, et al., "Managing User-Centric Adaptive Services for Pervasive Computing," Proceedings, International Conference on Autonomic Computing, 2004, (ICAC'04) May 17-18, 2004, pp. 248-255.

Mobilewhack.com, "Micro Mini Projector for your Mobile Phone by Light Blue Optics", Download Jun. 3, 2008, http://www.mobilewhack.com/reviews/micro_mini_projector_for_your_mobile_phone_by_light_blue_optics.html, 3 pages.

Slashphone.com, "Projector Mobile GPP2", Download May 14, 2009, http://www.slashponecom/111/3777.html, 4 pages.

International Search Report and Written Opinion dated Sep. 2, 2010 issued by the European Patent Office as International Searching Authority in connection with counterpart International Application No. PCT/US2010/037411 (10 pages).

* cited by examiner

US 8,231,233 B2

PORTABLE ELECTRONIC DEVICE AND METHOD OF POWER MANAGEMENT FOR SAME TO ACCOMMODATE PROJECTOR OPERATION

FIELD OF THE INVENTION

The present invention relates generally to portable electronic devices and, more particularly, to a portable electronic device and method of operation that manage power supplied by the device's power source when the device includes or sources power to a projector.

BACKGROUND

Projectors are well known for displaying images on various display surfaces, such as projection screens, walls, sheets, and so forth. Typically, projectors receive their power from alternating current (AC) power supplied to the building in which they operate. More recently, projectors have been shrinking in size and are now operable from portable power sources, such as rechargeable batteries. As the sizes of projectors decrease, the variety of their uses increases. For example, miniature projectors or microprojectors can be used either as a mobile desktop projector or as a handheld device. Additionally, small projectors may be integrated into or connectable to mobile wireless telephones, personal digital assistants (PDAs), MP3 players, notebook computers, or other portable electronic devices. For instance, a microprojector may be connectable to the USB port of a laptop computer so as to receive power from the computer's power source (e.g., battery).

As cell phones and other portable electronic devices have become smaller for improved portability, efficient use of the device's battery has become very important to maximize the time between recharging. Consequently, the portability of electronic devices can be improved through power management. While various portable electronic devices, such as cell phones and laptop computers, implement power management policies to extend battery life by deactivating certain features after a fixed, predetermined period of time (e.g., dimming a cell phone's display backlight alter a preset time period) or after a predetermined lime period of inactivity (e.g., activating a screen saver on a notebook computer after detecting a lack of user interface activity), no power management policy has been established for facilitating use of a projector in or with portable electronic devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG, 1 is a block diagram of a system of portable electronic devices (PEDs) that support operation of a projector in accordance with an exemplary embodiment of the present invention.

Figure 1:
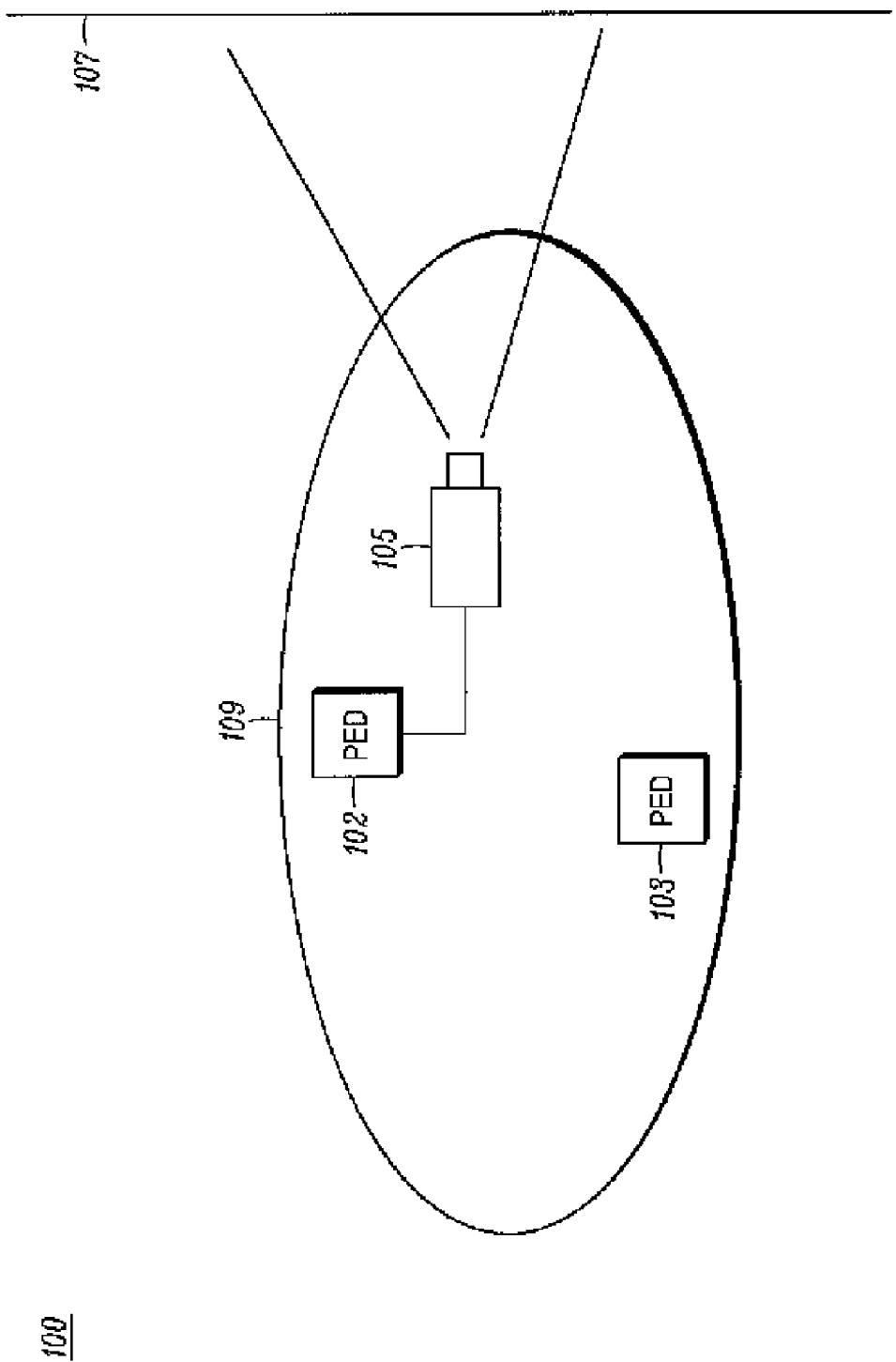

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses a portable electronic device and method of operation that facilitate operation of a projector from a power source of the portable electronic device while managing power supplied by the power source so as to maintain operation of at least the critical functionality of the portable electronic device. In accordance with an exemplary embodiment of the present invention, the portable electronic device (e.g., wireless phone, PDA, portable computer, portable gaming device, etc.) includes, inter alia, a power source (e.g., rechargeable battery), a memory, a user interface, and a processor. The memory is operable to store, inter alia, an image file (e.g., video file, slide presentation, photograph or group of photographs, multimedia file, and so forth) and associated content metadata. Depending on the content of the image file, the content metadata may include video length, size, and formal, quantity of images and their respective sizes and formats, quantity of slides in a slideshow or presentation, and associations between the file and other programs (e.g., whether a slide presentation (e.g., in PowerPoint) is associated with a meeting time stored in a calendar application, such as Outlook).

The user interface is operable to receive various user inputs, including a user input indicating a request to use the projector to perform a projection task. The projector may be in communication with the portable electronic device wirelessly (e.g., through use of Bluetooth, Wi-Fi, or Zigbee), via a cable or otherwise, or may be integrated into the portable electronic device. The projection task includes projecting one or more images from the stored image file onto a user-selected display surface.

The processor is operable to retrieve the image file's content metadata responsive to die user input and determine (e.g., project or estimate), based at least on the content metadata, whether the power source has sufficient power remaining to enable the projector to complete the projection task. In the event that the power source is not determined to have sufficient power remaining to enable the projector to complete the projection task, the processor is further operable to modify at least one of parameters associated with the projection task and functionality of the portable electronic device to increase a likelihood that the power source will he able to supply sufficient power to the projector to complete the projection task. The modification(s) to the projection task parameters and/or the portable device functionality may be automatic based at least on context data relating to operation of the projector, such as, for example, user preferences, history of prior modifications to projection task parameters and/or portable device functionality, a power management policy for the portable device, time of day, day of the week, day of the year, and location of the portable device. Alternatively, the modification(s) to the projection task parameters and/or the portable device functionality may be responsive to user input after the portable electronic device displays proposed projection task parameter modifications and/or proposed device functionality modifications to the user. The context data, when included, may be stored in the memory.

According to one, more preferable embodiment of the present invention, the processor is operable to determine whether the power source has sufficient power remaining to enable the projector to complete the projection task by: estimating an amount of power required from the power source for the projector to complete the projection task based at least on the content metadata; estimating an amount of time required for the projector to complete the projection task based at least on the content metadata; estimating an amount of operating time remaining for the power source taking into account the estimated amount of power required for the projector to complete the projection task; and comparing the estimated amount of time required for the projector to complete the projection task to the estimated amount of operating time remaining for the power source. When the estimated amount of time required for the projector to complete the projection task exceeds the estimated amount of operating time remaining for the power source, the processor determines (e.g., projects) that the power source does not have sufficient power remaining to enable the projector to complete the projection task.

In another embodiment, if the processor determines that the power source does not have sufficient power remaining to enable the projector to complete the projection task and further determines that modifying one or more of the parameters associated with the projection task and/or functionality of the portable electronic device will not enable the power source to supply sufficient power to the projector to enable it to complete the projection task, the processor is further operable to determine whether another portable electronic device in its general vicinity or in a general vicinity of the projector has sufficient power capacity to enable the projector to complete the projection task. If such another portable device exists and is willing to accept transfer of the stored image file (and, therefore, responsibility for the projection task), the processor transmits the image file to the other portable device for display by the projector.

By analyzing the content metadata for a stored image file, the present invention enables a portable electronic device to intelligently take steps to reduce its power consumption in order to accommodate use of a projector from the device's power source. For example, in circumstances, such as a business meeting, where a portable electronic device (e.g., smart phone) is used to power an embedded or externally connected micro projector, software running on the portable device determines whether its current battery capacity will likely be depleted before completion of a requested projection task (e.g., display of a video presentation) and, if so, attempts to modify projector display settings or temporarily disable certain, non-critical functionality of the portable device in order to increase the chances that the projection task can be completed. Additionally, the present invention allows the portable electronic device to consider other measures, such as transferring the image file to a collocated or nearby counterpart, in the event that the discharge state of the device's power source is such that the power source is likely incapable of accommodating the projection task or is capable of doing so, but only by disabling critical device functionality or unacceptably modifying the display parameters associated with completing the projection task.

Embodiments of the present invention can be more readily understood with reference to FIGS. 1-4, in which like reference numerals designate like items. FIG. 1 is an electrical block diagram of a system 100 that supports operation of a projector 105 in accordance with an exemplary embodiment of the present invention. The exemplary system 100 includes one or more portable electronic devices 102, 103 (two shown). The portable electronic devices 102, 103 may be any portable device that includes its own power source. For example, the portable electronic devices 102, 103 may be cellular phones, smart phones, PDAs, laptop computers, netbook computers, notebook computers, portable gaming devices, digital cameras, digital camcorders, handheld locating devices (e.g., portable global positioning system (GPS) devices), and so forth. The projector 105 may be coupled to one or more of the portable electronic devices 102, 103 either wirelessly or via a cable (e.g., as illustrated in FIG. 1). Alternatively, the projector 105 may be integrated or embedded into each portable device 102, 103.

Where the projector 105 is separate from the portable devices 102, 103, the portable devices 102, 103 include applicable input/output ports, such as universal serial bus (USB) ports, to facilitate interconnection with the projector 105. The portable devices 102, 103 are also preferably loaded with software programs that allow the devices 102, 103 to control operation of the projector 105, as well as provide power management in accordance with, the present invention. Details regarding the various components of the portable devices 102, 103 are provided below with respect to FIG. 2.

The projector 105 displays images on a display surface 107 selected by the projector's user depending upon the circumstances and/or environment of the display. For example, when the projector user is in a business meeting, the display surface 107 may be a pull-down or permanently installed projection screen. Alternatively, when the projector user is visiting a friend's house, the display surface 107 may be a wall or a white sheet. For clarity and image stability purposes, the projector 105 and possibly even the portable devices 102, 103 may be placed on a stable surface, such as a table 109. Operation of the system 100 in accordance with embodiments of the present invention is described below with respect to FIGS. 3 and 4.

Figure 2:
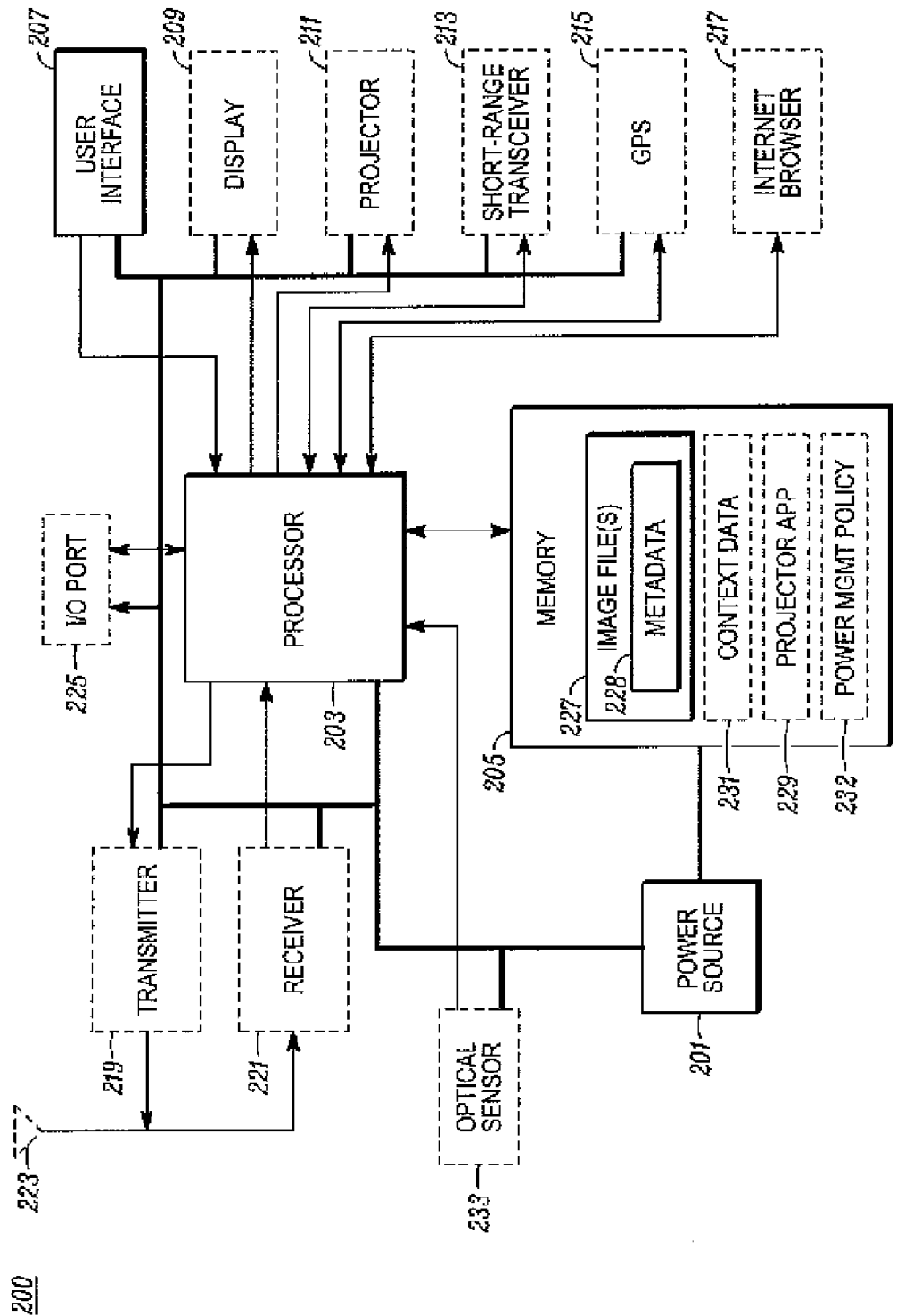
FIG. 2 is an electrical block diagram of a portable electronic device supporting operation of a projector and having optional wireless transmission and reception capability in accordance with an exemplary embodiment of the present invention.

FIG. 2 is an electrical block diagram of a portable electronic device 200 supporting operation of a projector and having optional wireless transmission and reception capability in accordance with an exemplary embodiment of the present invention. The portable device 200, which may be used to implement either or both of the portable electronic devices 102, 103 in the system 100 of FIG. 1, includes a power source 201, a processor 203, memory 205, and a user interface 207. The power source 201 may be a rechargeable battery (e.g., a lithium ion, nickel cadmium, nickel metal hydride, or lithium ion polymer battery), one or more replaceable batteries (e.g., alkaline batteries), one or more fuel cells, or any other source of electrical energy used by the portable electronic device 200. The processor 203 may be a microprocessor, a microcontroller, a digital signal processor (DSP), a slate machine, logic circuitry, or any other device or combination of devices that processes information based on operational or programming instructions stored in the memory 205. One of ordinary skill in the art will appreciate that the processor 203 can be implemented using multiple processors as may be required to handle the processing requirements of the present invention and the various other included functions of the portable electronic device 200. One of ordinary skill in the art will further recognize that when the processor 203 has one or more of its functions performed by a state machine or logic circuitry, the memory containing the corresponding operational instructions can be embedded within the state machine or logic circuitry as opposed to being external to the processor 203.

In one embodiment, the memory 205 stores, inter alia, one or more image files 227 and associated content metadata 228. The memory 205, which may be a separate element as depicted in FIG. 2 or may be integrated into the processor 203, can include random access memory (RAM), read-only memory (ROM), flash memory, electrically erasable programmable read-only memory (EEPROM), removable memory (e.g., a subscriber identity module (SIM) card, a memory stick, or a secure digital (SD) card), and/or various other forms of memory as are well known in the art. It will be appreciated by one of ordinary skill in the art that the various memory components can each be a group of separately located memory areas in the overall or aggregate device memory and that the device memory may include one or more individual memory elements.

The image file 227 may be any data file containing one or more images capable of being projected by a projector (e.g., a video file, a slide presentation, a multimedia file, a slideshow, a graphics file, etc.). The image file 227 may be pre-stored in the memory 205 or may be stored in the memory 205 as a result of communication of the image file 227 from another electronic device, which may he portable or fixed-positioned. The content metadata 228 for the image file 227 may be included as part of the image file 227 (e.g., as illustrated in FIG. 2) or may be stored separately. The content metadata 228 includes information regarding the content of the image file 227. For example, the content metadata 228 may include video length, size and format (e.g., for a video file); quantity of photos, size of each photo, and format of each photo (e.g., for a photo directory); an indication of whether the image file includes color or merely black and while images; information indicating whether the image file 227 is associated with another program or event (e.g., a meeting entry in a Microsoft Outlook calendar application); and/or a quantity of slides and sizes thereof (e.g., for a PowerPoint presentation).

The user inter lace 207 may he any component or combination of components that allows a user of the portable electronic device 200 to provide inputs to, or otherwise instruct, the portable electronic device 200 with respect to actions to be taken or functionality to be performed by the portable device 200. Thus, the user interface 207 may be one or more of a keypad, a keyboard, a touch screen, a thumbwheel, scroll buttons, a microphone accompanied by voice recognition software, and/or any other hardware and software components that accept user inputs.

Besides the power source 201, processor 203, memory 205, and user interface 207, the portable electronic device 200 may further optionally include a variety of other components and functionality. For example, the portable electronic device 200 may further include a display 209, a projector 211 (e.g., a microprojector), a short-range transceiver 213 (e.g., operable in accordance short-range wireless protocols, such as Bluetooth, Wi-Fi (IEEE 802.11), or Zigbee (IEEE 802.15.4)) to provide short-range wireless functionality, a location-determining device (e.g., a GPS receiver 215) to provide location-related functionality, a web browser 217 to provide Internet access functionality, a wide area network transmitter 219, a wide area network receiver 221, an antenna 223, one or more input/output (I/O) ports 225 (one shown), and an optical sensor 233. Additionally, the portable device memory 205 may further optionally store an application 229 for operating the projector 105, 211, context data 231 associated with projector operation, and a power management policy 232 providing a procedure for reducing power consumption in the portable device 200 when necessary.

When in eluded, the display 209 may be a liquid crystal display (LCD), a light emitting diode (LED) display, an organic LED display, or any other type of display. For example, the display 209 may include a speaker or other audio transducer to facilitate audible display of information in addition to, or in place of, visual display. In one embodiment, the display 209 may be integrated with the user interface 207 to form, for example, a touch screen display.

The projector, when included, may be a mini-projector, a microprojector, or any other device capable of projecting an image onto a display surface spaced a distance from the portable electronic device 200. When the portable device 200 includes a projector 211, the portable device memory 205 preferably stores an application 229 for operating the projector 211. In such a case, the projector application 229 is executed by the processor 203 in accordance with known techniques responsive to user input via the user interface 207 requesting execution of the application 229 to perform a projection task. Additional user input via the user interface 207 may he necessary during execution of the projector application 229.

Alternatively, the portable device memory 205 may store the projector application 229 even though the projector is external to the portable device 200 (e.g., as is the projector 105 shown in FIG. 1) and is coupled to the portable device 200 either wirelessly (e.g., via the short-range transceiver 213) or via a cable (e.g., via the I/O port 225). In this case, the processor 203 would execute the application 229 responsive to a user request via the user interface 207 and exchange information via the applicable wireless or wired interface.

The short-range transceiver 213 and associated signal processing functions of the processor 203, when included, are designed to implement and support a shorter-range wireless protocol, such as Wi-Fi (IEEE 802.11), Bluetooth, Zigbee, Ultra Wide-Band (e.g., IEEE 802.15.4a draft standard), or a proprietary protocol, operating to communicate digital information, such as data, control information, and/or audio, between the portable electronic device 200 (e.g., device 102 in FIG. 1) and another portable electronic device (e.g., device 103 in FIG. 1) over a short-range wireless link. As is well understood in the art, the short-range transceiver 213 integrates both transmit and receive functionality. Alternatively, separate transmitters and receivers (not shown) may be respectively used in place of the short-range transceiver 213.

The GPS receiver 215 is well known and receives timing signals from orbiting GPS satellites in order to enable the processor 203 or another device to determine the location of the portable electronic device 200. As noted above, the GPS receiver 215 is merely one of several known techniques for providing location functionality to the portable electronic device 200.

The web or Internet browser 217 is also well known and may be implemented in browser software stored in the memory 205 and executed by the processor 203. The Internet browser 217 provides Internet access functionality to the portable electronic device 200.

The wide area transmitter 219, the wide area receiver 221, and the antenna 223, when included, provide wireless communication functionality over a wide area wireless system, such as a cellular system, personal communications system, satellite system, or trunked radio system. When the transmitter, 219, receiver 221, and antenna 223 are included, the processor 203 performs various known signal processing functions to implement and support the wireless protocol used to communicate over the wide area wireless system. The transmitter, 219, receiver 221, and antenna 223 may be included within the portable electronic device 200 when the device 200 is a smart phone or a cellular phone. Alternatively, the transmitter, 219, receiver 221, and antenna 223 may be contained in a Personal Computer Memory Card International Association (PCMCIA) card or other so-called "air card" that is insertable into an I/O port of the portable electronic device 200 instead of being directly integrated into the portable electronic device 200. The inclusion of the transmitter 219, receiver 221, and antenna 223 via an air card may occur when the portable electronic device 200 is a laptop or other portable computer. In a further embodiment, the transmitter 219 and the receiver 221 may be combined into a single transceiver as is known in the art.

When included, the I/O port(s) 225 may be one or more USB ports, one or more PCMCIA ports, one or more RS232 ports, or any other ports for interconnecting accessory devices to the portable electronic device 200 or for facilitating communication between the portable electronic device 200 and another electronic device.

The optical sensor 233, when included, may be a photodiode or other photo sensor. Alternatively, the optical sensor 233 may be implemented as a digital camera having light-detecting features. When the optical sensor 233 is a digital camera, such camera may be integrated into the portable electronic device 200 or may be connected to the portable electronic device 200 (e.g., via an I/O port 225).

In an alternative embodiment in which the projector (e.g., projector 105) is separate from the portable device 200 and is connected to the portable device 200 via an I/O port 225 for purposes of receiving DC power from the portable device's power source 201, the image file 227 and its associated content metadata 228 may be stored remotely from the portable device 200. In such a case, the image file 227 and its associated content metadata 228 may be accessed or retrieved by the portable device 200 (e.g., wirelessly via the short-range transceiver 213 or the wide area transmitter 219 and receiver 221, or through a cable via an I/O port 225) for purposes of evaluating whether the portable device's power source 201 has sufficient capacity remaining to enable the projector 105 to complete its intended projection task.

In a further embodiment, the memory 205 may store optional context data 231 relating to operation of a projector 105, 211. The context data 231 may include the portable device's location (e.g., as determined by the processor 203 based on input from the GPS receiver 215), brightness in a room or other area in which the portable device 200 resides or in which the projector 105, 211 is intended to operate (e.g., as determined by the processor 203 based un signals or information received from the optical sensor 233), the image size at the location as displayed on the display surface 107, user preferences as entered by the user via the user interface 207 (e.g., during initial installation or setup of the projector application 229), power-saving history information (e.g., history of prior modifications to one or more parameters associated with a projection task and/or history of prior modifications to functionality of the portable electronic device for power saving purposes), time of day, day of the week, and/or day of the year. As described in more detail below, the processor 203 may utilize the context data 231 to determine modifications to be made to projection task parameters and/or portable device functionality in order to conserve power to support projector operation in accordance with one embodiment of the present invention.

The memory 205 may further store a power management policy 232 for the portable electronic device 200. The power management policy 232 may include criteria and procedures for reducing power consumption in order to extend the operating time of the portable device's power source 201. For example, the power management policy 232 may include timers associated with reducing the brightness of the user interface's (e.g., keypad's) backlight or activating a screen saver on the display 209. The power management policy 232 may also include proposed modifications to be made to projection task parameters and/or portable device functionality in order to conserve power source (e.g., battery) power to support projector operation. Thus, in one embodiment, the power management policy 232 may form part of the context data 231.

The power source 201 is coupled directly or indirectly to all components of the portable device 200 requiring electrical (e.g., direct current) power to operate, including, hut not limited to, the processor 203, the memory 205, the user interface 207, and several of the optional devices, such as the display 209, the projector 211, the short-range transceiver 213, the GPS receiver 215, the wide area transmitter 219, the wide area receiver 221, the I/O port 225, and the optical sensor 233. In FIG. 2, the power source 201 is not illustrated as being coupled to the Internet browser 217 because the browser 217 is effectively a soil ware program stored in the memory 205, which does receive power from the power source 201. The processor 203 is coupled to the memory 205, the user interface 207, and, in one embodiment, all or substantially all of the optional devices and functionality shown in FIG. 2.

Figure 3:
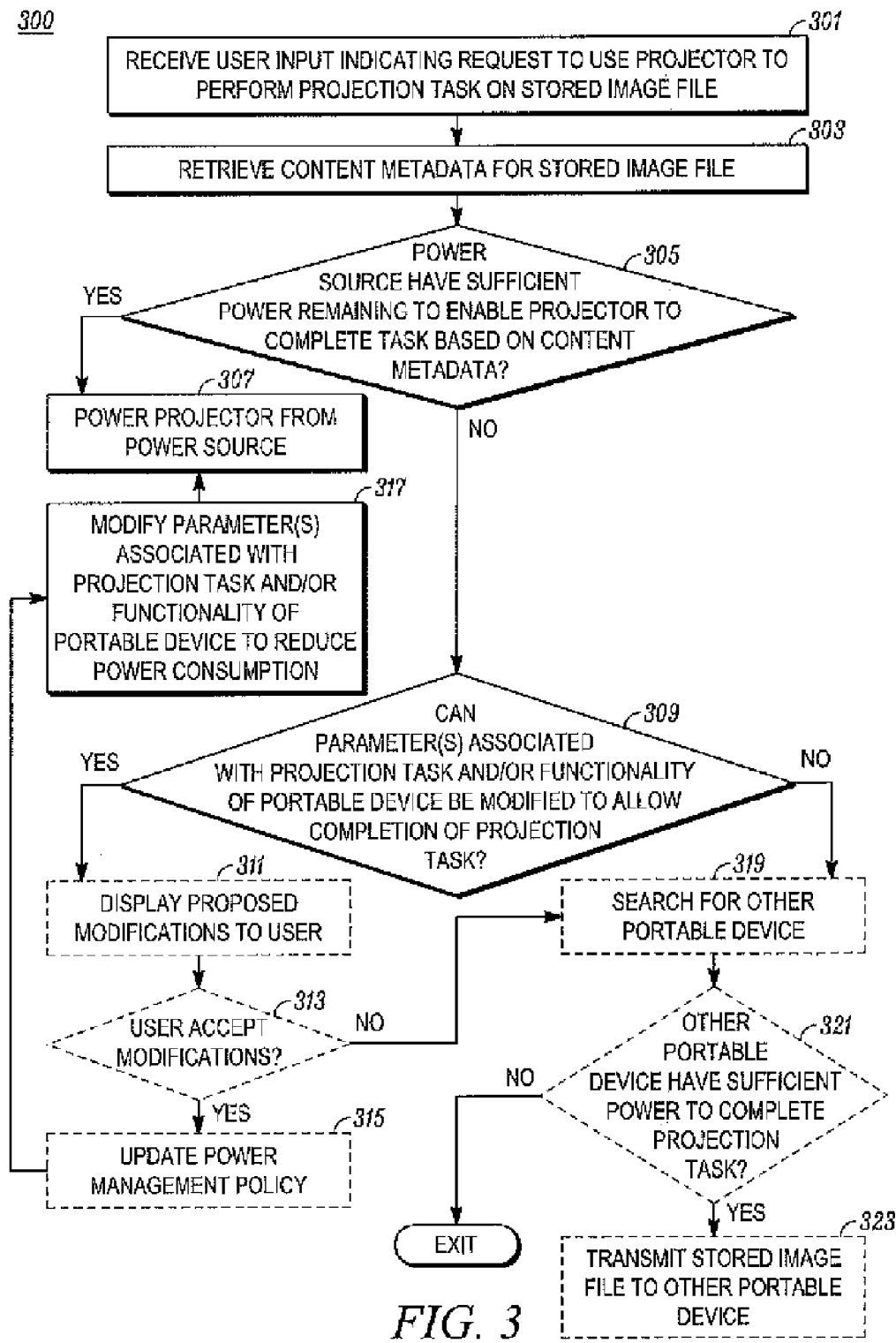
FIG. 3 is a flow diagram of steps executed by a portable electronic device to manage power supplied by the device's power source in support of operation of a projector in accordance with an exemplary embodiment of the present invention.

Referring now to FIGS. 1-3, operation of the exemplary system 100 of portable electronic devices 102, 103 to support projector functionality occurs substantially as follows in accordance with one embodiment of the present invention. One of ordinary skill in the art will readily recognize and appreciate that the functions of the processor 203, as described in detail below with respect to the logic flow 300 of FIG. 3, may be controlled by software or firmware stored in the memory 205 and executed by the processor 203.

When a user of a portable electronic device 102 desires to use a projector 211 integrated into the device 102 or a projector 105 coupled to the device 102 (e.g., via a USB cable) to perform a projection task (e.g., display an image file on a projection screen or other user-selected display surface 107), the portable device processor 203 receives (301) user input via the user interface 207 indicating a request to use the projector 105, 211 to perform the projection task on one or more stored image files. The image file 227 may be stored in tire memory 205 of the portable device 102, or may be stored remotely and be accessible by the processor 203 either wirelessly (e.g., via the wide area transmitter 219 and receiver 221 or via the short-range transceiver 213) or via a cable (e.g., through an I/O port 225). In one embodiment, the user input may be a request to execute a software application 229 that controls the operation of the projector 105, 211. For example, the user may utilize the user interface 207 to select the projector application 229 from a group of applications that are executable by the portable device processor 203 and may further utilize the user interface 207 to select the image file 227 or files to be displayed as part of the projection task.

Responsive to receiving a request to use the projector 105, 211 and selection of one or more image files 227 to be displayed by the projector 105, 211, the portable device processor 203 retrieves (303) content metadata 228 for the stored image file(s) 227. The content metadata 228 may he any data associated with the stored image file 227 from which the processor 203 can evaluate the amount of power required from the portable device's power source 201 in order for the projector 105, 211 receiving such power to complete the projection task. For example, content metadata 228 may include, inter alia, the size, type, and color content of the image file 227, a video length and codec where the image file 227 is or includes video, a quantity of slides or photos where the image file 227 is a slide presentation or directory of photos, a duration of an event (e.g., a meeting) stored in a calendar application, such as Outlook, to which the image file 227 is linked, and so forth.

The portable device processor 203 then determines (305), based on the content metadata 228, whether the portable device's power source 201 has sufficient power remaining to enable the projector 105, 211 to complete the projection task. For example, when the power source 201 is a battery, the processor 203 projects whether the battery can supply the power necessary to complete the projection task in view of the expected power needs of the projector 105, 211 to display the image file 227 and the current discharge state or remaining capacity of the battery. Procedures for determining the discharge state or remaining capacity of a battery (e.g., a rechargeable battery) are well known and are regularly used in various portable electronic devices, such as cellular phones, cameras, gaming devices, camcorders, and portable computers. In an alternative embodiment, the determination of sufficient or insufficient power capacity may occur during execution of a projection task in addition to, or instead of, prior to execution of such task.

To determine whether the power source 201 has sufficient power capacity remaining to handle the power consumption needs of the projector 105, 211, the processor 203 may, according to one embodiment of the present invention: (i) estimate an amount of power required from the power source 201 for the projector 105, 211 to complete the projection task based at least on the content metadata 228. (ii) estimate an amount of tune required for the projector 105, 211 to complete the projection task based at least on the content metadata 228, (iii) estimate ion amount of operating time remaining for the power source 201 taking into account the estimated amount of power required for the projector 105, 211 to complete the projection task, and (iv) compare the estimated power source operating time to the estimated amount of time required to complete the projection task. For example, to estimate the amount of power required to complete a projection task, the processor 203 may examine the content metadata 228 to determine the type, size, and color scheme of the image file 227 that is to be displayed by the projector 105, 211. The file type may inform the processor 203 as to which application (e.g., Windows Media Player or PowerPoint) would need to be executed in order to display the image file 227, and the file size and/or color scheme may inform the processor 203 as to how much processing power would likely be needed to open and process the file for a period of time (e.g., per minute). The power requirements for the various applications used to display an image file, as well the power requirements for running the projector 105, 211 generally, may be stored in device memory 205 and accessed by the processor 203 to estimate or otherwise determine the power necessary to complete the projection task.

To estimate the amount of time required to complete the projection task, the processor 203 may further evaluate the content metadata 228 and optionally other data or information. For example, where the image file 227 is a video or multimedia file, the content metadata 228 may include the length of the video or file. Consequently, the processor 203 may examine the content metadata 228 and estimate that the projector 105, 211 will be in use to complete the projection task (e.g., display the image file 227) for an amount of time corresponding to the length of the video or multimedia file. Alternatively, the content metadata 228 may indicate an association between the image file 227 and an event stored in a calendar application, such as Microsoft Outlook. In such a case, the processor 203 may examine the content metadata 228 and, upon identifying the event association, review the event data in the calendar application to determine the time duration, of the event. For instance, if a slide presentation was linked to a meeting event and the meeting event was stored in the calendar application as an hour long event, the processor 203 may estimate, upon examining the content metadata 228 and the calendar application event data, that the projector 105, 211 would require one hour to complete the projection task.

To estimate the amount of operating time remaining for the power source 201, the processor 203 may determine (e.g., estimate) the current capacity of the power source 201 in accordance with known techniques, as well as determine the aggregate amount of power requited to complete the projection task and operate all the other currently active or enabled functions of the portable device 200. The amount of power required to complete the projection task and operate all the other currently active or enabled functions of the portable device 200 may be estimated based on current drain estimates stored in memory 205. The processor 203 may then divide the current capacity of the power source 201 by the aggregate power requirements for the projection task and the active portable device functionality to estimate the amount of operating time remaining for the power source 201. For example, where the power source 201 is a battery, upon estimating the amount of power required to complete the projection task, determining the current power requirements of the portable device 102, and determining the current capacity or discharge slate of the battery, the processor 203 may estimate the amount of operating time remaining for the battery by dividing the battery capacity by the aggregate power requirements of the projection task and the portable device 102. A similar analysis may be employed by the processor 203 for other power sources, such as fuel cells.

After the amount of lime required for the projector 105, 211 to complete the projection task and the amount of operating time remaining for the power source 201 have been estimated, tire processor 203 may compare the two estimates to determine whether the power source 201 is projected to have sufficient power capacity remaining to enable the projector 105, 211 to complete the requested projection task. For example, when the estimated amount of operating time remaining for the power source 201 exceeds, either absolutely or by a predetermined amount or percentage, the estimated amount of lime required for the projector 105, 211 to complete the projection task, the processor 203 may determine or project dial the power source 201 has sufficient power capacity remaining to enable the projector 105, 211 to complete the projection task. On the other hand, when the estimated amount of time required for the projector 105, 211 to complete the projection task exceeds the estimated amount of operating time remaining for the power source 201 or is not less man the estimated amount of operating time remaining for the power source 201 by a predetermined amount or percentage, the processor 203 may determine or project that the power source 201 does not have sufficient power remaining to enable the projector 105, 211 to complete the projection task.

In the event that the power source 201 is projected to have sufficient power capacity remaining to enable the projector 105, 211 to complete the projection task, the projector 105, 211 is powered (307) from the power source 201 in the ordinary course of operation of the portable device 102, without modification to any functionality of the portable device 102 and/or without modification to any of the parameters associated with the projector 105, 211 or the projection task. For example, where the projector 105 is external to the portable device 102, the processor 203 may allow an I/O port 225 to supply power to the projector 105 from the power source 201 and/or may supply signals associated with the projection task (e.g., appropriately formatted data representing the image file 227) to the projector 105 through an I/O port 225. Alternatively, where the projector 211 is integrated into the portable device 102, the processor 203 may supply signals associated with the projection task (e.g., appropriately formatted data representing the image file 227) directly to the projector 211.

On the other hand, in the event that the power source 201 is not projected to have sufficient power capacity remaining to enable the projector 105, 211 to complete the projection task, the processor 203 determines (309) whether modifying one or more parameters associated with the projection task and/or functionality of the portable device 102 will enable the power source 201 to supply sufficient power to complete the projection task. For example, the processor 203 may determine whether it can lower the power requirements of the projection task by changing projection task parameters. In such a case, the processor 203 may determine whether reducing one or more of the laser scanning speed of the projector 105, 211, the resolution, brightness, contrast, and/or size of the images to be displayed, and/or the quantity of colors used in the displayed images will result in substantial enough power savings to allow projection task completion. Alternatively or additionally, the processor 203 may determine whether it can lower the overall power requirements of the portable device 102 by modifying non-projector functionality to facilitate completion of the projection task. For example, the processor 203 may determine whether non-critical functionality can be temporarily disabled to conserve power for projector operation. Depending on the type of portable device, non-critical functionality may include short-range wireless functionality, wide area wireless functionality, Internet access (e.g., web browsing) functionality, wireless messaging functionality (e.g., instant message, email, short message), location-related functionality (e.g., GPS), the use en duration of keypad backlighting, and/or the use or duration of display lighting, just to name a few. One of ordinary skill in the art will readily recognize that various other projection task parameters and/or portable device functionality may be considered for modification to facilitate use of the projector 105, 211 to complete the projection task.

In the event that the processor 203 determines that projection task parameters and/or portable device functionality can be modified to reduce power consumption sufficiently to enable the projector 105, 211 to complete the projection task (or to at least increase a likelihood that the power source 201 will be able to supply sufficient power to the projector 105, 211 to complete (the projection task), the processor 203 modifies (317) the projection task parameters and/or the portable device functionality to reduce power consumption. However, before doing so or to determine which projection task parameters or portable device functionality should he modified, the processor 203 may optionally seek user input and/or other information to aid the processor 203 in its selection of the projection task parameters or the portable device functionality to modify.

For example, the processor 203 may display (311) proposed modifications to the portable device user via the device's display 209 to determine whether the user accepts the proposed modifications. The modification options may be displayed in a list or table such that each option is selectable by the user via the user interface 207. Alternatively, the processor 203 may indicate a specific set of proposed modifications (e.g., disable Internet access and test messaging, turn off keypad backlight, disable Bluetooth, and reduce resolution to 600×800) for acceptance by the user. In one embodiment, the proposed modifications (and any resulting actual modifications) may correspond or conform to the power management policy 232 stored in device memory 205. As noted above, the power management policy 232 defines the procedure generally used by the processor 203 to minimize power consumption and extend the life of the power source (e.g., time between recharging).

Alternatively or additionally, the proposed modifications (and any resulting actual modifications) may be based on stored context data 231 relating to operation of the projector 105, 211. As noted above, the context data 231 may include user preferences (e.g., reduce resolution before brightness or disable internet access, text messaging, and keypad lighting before adjusting projection task parameters), history of prior modifications to projection task parameters and/or portable device functionality, the power management policy 232, time of day, day of the week, day of the year, and location of the portable device 102 (e.g., as determined based on signals received by the GPS receiver 215). For example, time of day, day of the week, and day of the year may, either alone or in combination with each other or other context data, impact which applications/portable device functionality is critical for the user and/or winch projection task parameters may be more preferably modified (e.g., image brightness be more readily turned down daring evening hours). Other context data 231 may be determined and stored in real time or substantially real lime to take into account the environment in which the portable device 102 and/or the projector 105, 211 are operating. For example, the processor 203 may receive input from an optical sensor 233 (e.g., the ambient light determination functionality of an imbedded digital camera) to enable the processor 203 to determine the brightness of the room or other area in which the projector 105, 211 is intended to operate and, thereby, propose or automatically make changes to the projector brightness for purposes of increasing the likelihood that the projection task can be completed. Thus, the proposed modifications to the projection task parameters and/or the portable device functionality may lake into account the context data 231 in order to conserve power, while permitting acceptable projection of the requested image file 227 and maintaining at least critical functionality of the portable device 102.

After the processor 203 optionally displays the proposed projection task parameter/portable device functionality modifications to the user, the processor determines (313) whether the user has accepted the proposed modifications. For example, the processor 203 may determine whether the user interface 207 received input from the user indicating the users acceptance or rejection of one or more of the proposed modifications. If the user has indicated an acceptance of one or more of the proposed modifications, the processor 203 optionally updates (315) the power management policy 232 to incorporate the accepted modifications, or otherwise saves or stores power-saving history information related to which modifications were accepted, and modules (317) the projection task parameters and/or portable device functionality based on the accepted modifications. The saved modification information and/or power management policy 232 may then be used as context data 231 for powering of a projector 105, 211 in the future. For example, when the processor 203 receives another input via the user interface 207 requesting use of a projector 105, 211 to perform a subsequent projection task and determines that the power source 201 does not have sufficient power to complete the new projection task, the processor 203 can modify projection task parameters and/or portable device functionality based on the previously saved modification information and the power management policy 232, as applicable, to increase the likelihood that the power source 201 will be able to supply sufficient power to complete the new projection task.

In an alternative embodiment, the processor 203 may automatically modify (317) the projection task parameters and/or the portable device functionality based on one or more of the context data 231, the power management policy 232, and power consumption information relating to various projection task parameters and portable device functionality, without seeking or receiving user input. In such a case, the processor 203, upon determining (309) that projection task parameters and/or portable device functionality can be modified to permit completion of the requested projection task, proceeds to modify the projection task parameters and portable device functionality, as applicable, to reduce power consumption at least enough to facilitate completion of the projection task. For example, depending upon the amount of power to be conserved, the processor 203 may reduce at least one of a laser scanning speed of the projector 105, 211, the resolution, brightness, contrast or size of displayed images, and a quantity of colors used in displayed images. Alternatively or additionally, the processor 203 may deactivate or disable short-range wireless communication functionality, Internet access functionality, keypad lighting, display lighting, location-related functionality, messaging-related functionality, or other non-critical functionality of the portable device 102.

Referring back to decision blocks 309 and 313 of FIG. 3, in the event that the processor 203 determines that parameters associated with the projection task and/or portable device functionality cannot be modified to allow completion of the projection task, or that the user has not accepted proposed modifications to the projection task parameters and/or portable device functionality, the processor 203 optionally searches (319) for another portable electronic device 103 to which to communicate the stored image file 227 for projected display. For example, as illustrated in FIG. 1, if the processor 203 in portable device 102 determines that its power source does not have sufficient power to complete the projection task and further determines that projection task parameter/device functionality modifications cannot be made to allow completion of the projection task, the processor 203 may seek out or search for a portable device 103 in the same room. Such searching may be accomplished by transmitting a projection task transfer request message to all nearby portable devices via the short-range transceiver 213 or the wide area transmitter 219. Foe example, the searching device 102 may send such a message to the queried device 103, which may then display the request to its user for acceptance or rejection. Alternatively, the queried device 103 may automatically respond to the message, particularly where the queried device 103 has a built-in projector 211. In one embodiment, when a portable electronic device 200 is configured (e.g., with appropriate software) to perform power management for projection tasks as described herein, such device 200 may be contemporaneously configured (e.g., via such software) to accept and respond to inquiries from other portable devices that are searching for portable devices to perform projection tasks when the portable devices receiving the original projection task requests determine they are incapable of completing the requested tasks.

If the searching portable device 102 receives an acknowledgment of receipt of the projection task transfer request message from a nearby portable device 103, the portable device 102 optionally determines (321) whether the responding device 103 has sufficient power capacity to complete the requested projection task. For example, in one embodiment the searching portable device 102 may transmit a power availability query or equivalent message to the responding portable device 103 requesting information with respect to an available capacity of the responding device's power source 201. Upon receiving the requested information regarding the responding device's power source capacity (e.g., in the form of a power availability or equivalent message), the searching device 102 determines whether the power source 201 of the responding device 103 has sufficient capacity remaining to complete the requested projection task. For example, the searching device 102 may compare the reported, available capacity of the responding device's power source 201 to the amount of power determined to be necessary to complete the projection task in connection with block 305 and, if the reported capacity is greater than or equal to the amount of power determined to be necessary to complete the projection task, determine that the responding device's power source 201 has sufficient capacity to complete the projection task.

If the searching device 102 determines that there aren't any nearby portable devices with sufficient available power capacity to complete the projection task, the processor 203 exits the logic flow. On the other hand, if the searching device 102 determines that a responding portable device 103 has sufficient available power capacity to complete the projection task, the searching device 102 transmits (323) the stored image file(s) 227 to the responding portable device 103 for projection by a projector 105, 211 powered by the responding device 103. Transmission of the image file 227 may be wireless (e.g., via the short-range transceiver 213 or the wide area transmitter 219), wired (e.g., though use of a USB cable or other cable), or manual (e.g., through storage of the image file 227 on a portable memory device, such as a USB drive, and connection of the portable memory device to an applicable I/O port 225 of the responding device 103). Where the projector 105 is external to both the searching device 102 and the responding device 103, and both devices 102, 103 are in the same room as illustrated in FIG. 1, the projector 105 may be disconnected from the original device 102 and connected to the new device 103.

In one alternative embodiment, after determining that the responding device 103 has sufficient power capacity to complete the projection task but prior to transmitting the image file 227 to the responding device 103, the searching device 102 may transmit a request to accept transfer of the image file 227 or an equivalent message to the responding device 103. The responding device 103 may display the accept transfer request message to the device user for manual confirmation of acceptance of the transfer. If the responding device 103 does not accept transfer of the image file 227 (whether automatically or responsive to manual input), the searching device 102 may receive an image transfer response or other acknowledgement message indicating the responding device's refusal to accept the image file 227. On the other hand, if the responding device 103 accepts transfer of the image file 227 (whether automatically or responsive to manual input), the searching device 102 may receive an image transfer response or other acknowledgement message indicating the responding device's agreement to accept transfer of the image file 227. Upon receiving a positive response to the accept transfer message, the searching device 102 may transmit (323) the image file 227 to the responding device 103.

Figure 4:
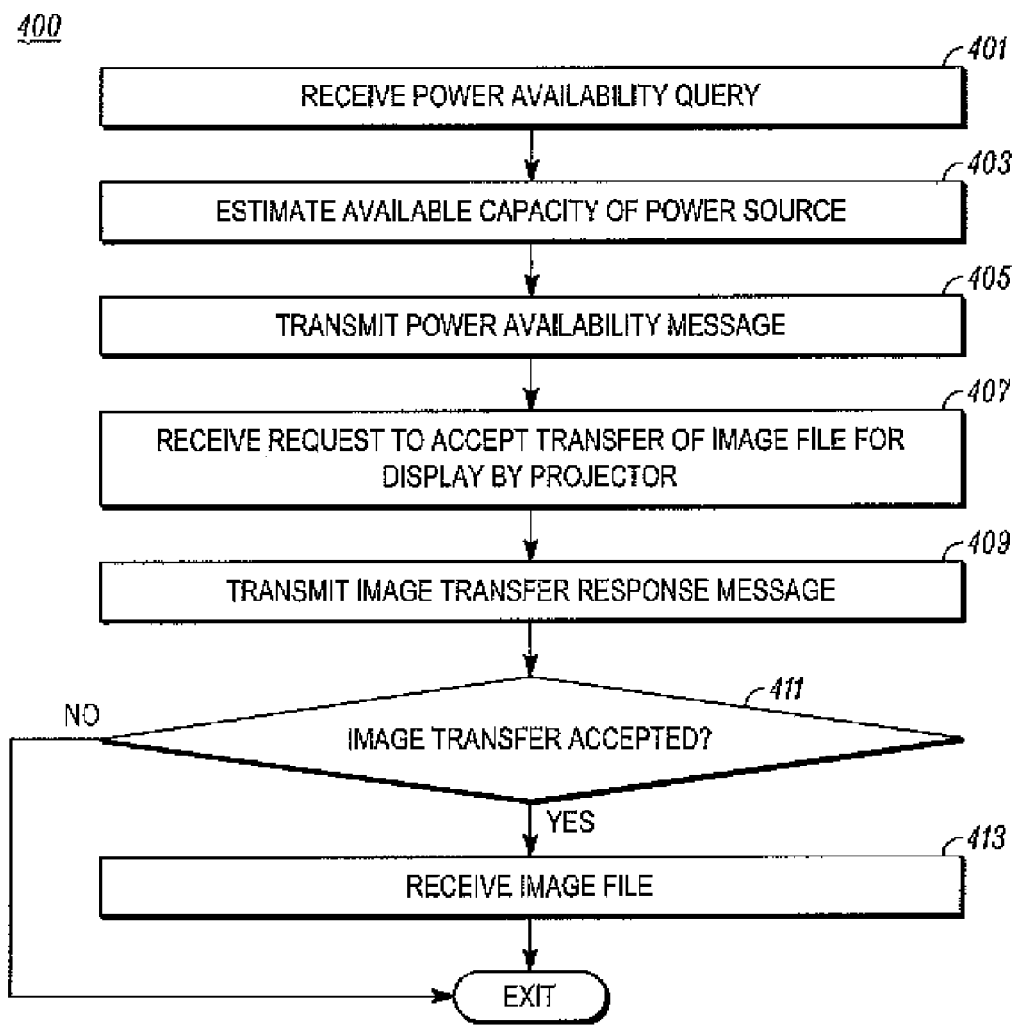
FIG. 4 is a flow diagram of steps executed by a portable electronic device to cooperate with another portable electronic device in utilizing a power source to support of operation of a projector in accordance with an exemplary embodiment of the present invention.

Referring now to FIGS. 1, 2 and 4, operation of the exemplary system 100 of portable electronic devices 102, 103 to support projector functionality occurs substantially as follows in accordance with an alternative embodiment of the present invention. One of ordinary skill in the art will readily recognize and appreciate that the functions of the processor 203, as described in detail below with respect to the logic flow 400 of FIG. 4, may be controlled by software or firmware stored in the device memory 205 and executed by the processor 203. The logic flow 400 of FIG. 4 illustrates functionality performed by a portable device, such as portable device 103, to which another portable device, such as portable device 102, desires to transfer an image file 227 for projection by a projector 105, 211 powered by the target device 103 when the originating device 102 does not have sufficient power capacity remaining to complete a projection task related to the image file 227. The determination of sufficient or insufficient power capacity may occur prior to and/or during execution of a projection task.

In accordance with the alternative embodiment, a first portable device 103 receives (401) a power availability query or equivalent message from a second portable device 102 that is searching for a target device to which to transfer an image file for projection by a projector 105, 211 powered by the target device. The power availability query may be received by the second device 103 wirelessly via, for example, the short-range transceiver 213 or the wide area receiver 221. Responsive to the power availability query, the second device 103 estimates (403) or otherwise determines an available capacity of its power source 201 in accordance with known techniques and transmits (405) a power availability or equivalent message to the searching device 102 via the short-range transceiver 213 or wide area transmitter 219 of the second device 103. The power availability message includes an identifier (ID) of the second device 103 and information regarding the estimated available capacity of the target device's power source 201. For example, the power availability message may include the charge or discharge state, or the capacity in milliamp hours, of the second device's power source 201 where the power source 201 is a rechargeable battery.

Some time after transmitting the power availability message, the second portable device 103 may receive (407) a request (e.g., wirelessly via the short-range transceiver 213 or the wide area receiver 221) to accept transfer of an image file 227 for display by a projector embedded in the second device 103 (projector 211) or coupled/coupleable to the second device 103 (e.g., projector 105). The second device 103 may display the request to its user to receive user acceptance of the request via the user interface 207. Either automatically upon evaluating the power capacity of its own power source 201 or responsive to user input, the second device 103 transmits (409) an image transfer response or equivalent message to the searching device 102 (e.g., wirelessly via the short-range transceiver 213 or the wide area transmitter 219). The image transfer response message indicates whether the second device 103 will accept transfer of the image file 227 and its associated projection task to facilitate projection of the image file 227 by the projector 105, 211. If the second device 103 accepted (411) the image transfer, the second device 103 receives (413) the image file 227 for projection by the projector 105, 211. On the other hand, if the second device 103 rejected the image transfer, the second device 103 exits the logic flow.

In yet another embodiment of the present invention, the second device 103 may respond to a request to transfer an image file 227 or a projection task received from the searching device 102 by transmitting the second device's ID as part of an acknowledgment message. The searching device 102 may then compare the received ID with a contact list stored in the device memory 205 (e.g., where the two devices 102, 103 are wireless communication devices, such as cellular or smart phones). The name of the contact corresponding to the received ID may be displayed on the display 209 of the searching device 102 to enable the user of the searching device 102 to contact the user of the second device 103 (e.g., with or without using the communication capabilities of the portable devices 102, 103) to request that the image file 227 be sent to the second device 103 for display by the projector 105, 211. If the user of the second device 103 accepts file transfer, the searching device transmits the image file 227 to the second device 103 (e.g., wirelessly via the short-range transceiver 213 or the wide area transmitter 219). If the user of the second device 103 rejects the transfer, the searching device 102 continues searching for another device to accept the image transfer or ceases its search.

The present invention encompasses an apparatus and method for operating a portable electronic device to manage power consumption so as to permit the portable electronic device to support operation of a projector. With this invention, power consumption of exhaustive power sources, such as batteries, in portable devices may be managed to enable the portable devices to support operation of an embedded or externally connected projector, while maintaining critical functionality of the portable device. By analyzing an image file's content metadata, intelligent power management decisions may be made to modify projection task parameters and/or device functionality to balance the portable device's functionality and power needs with the goal of a projection task. Further, the present invention provides for the storage and use of data regarding historical power savings actions taken to reduce power consumption in support of projector operations. Power conservation proposals that are accepted by the portable device user are used to update the portable device's power management policies, which may then be used in support of future projector operations, As detailed above, embodiments of the present invention reside primarily in combinations of method steps and apparatus components related to operating a portable electronic device to manage power consumption so as to permit the portable electronic device to support operation of a projector. Accordingly, the apparatus components and method steps have been represented, where appropriate, by conventional symbols in the drawings, snowing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual relationship or order between such entities or actions. The terms "includes," "comprises," "including," "comprising," and any other variations thereof are intended to cover a non-exclusive inclusion, such that a process, method, article, or apparatus that comprises or includes a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the portable electronic device 200 described herein may be comprised of one or more conventional processors and unique stored program instructions that control the processors) to implement, in conjunction with certain non-processor circuits, some, most, or all of the functions of the portable electronic device 200 and its operational methods as described herein. The non-processor circuits may include, but are not limited to the power source 201, the device memory 205, the user interface 207, the display 209, the projector 211, the short-range transceiver 213, the GPS receiver 215, the wide area transmitter 219, the wide area receiver 221 and the optical sensor 233 described above, as well as filters, signal drivers, clock circuits, over-current protection circuits, and various other non-processor circuits. As such, the functions of these non-processor circuits may be interpreted as steps of a method to operate a portable electronic device to manage power consumption so as to permit the portable electronic device to support operation of a projector. Alternatively, some or all functions could be implemented by a state machine that has no stored program instructions, or in one or more application specific integrated circuits (ASICs), in which each function or some combinations of certain of the functions are implemented as custom logic. Of course, a combination of the above approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. For example, while the foregoing description has focused on analyzing the capacity of a portable electronic device's power source prior to commencement of a projection task, those of ordinary skill in the art will readily recognize that present, invention is equally applicable to analyzing power source capacity after a projection task has commenced, but before it has ended. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the churns. The invention is defined solely by the appended claims including any amendments made during the pendency of this application and all equivalents of those claims as issued.

We claim:

1. A method of operation of a portable communication device, the portable communication device receiving power from an accompanying power source and supporting operation of a projector, the projector being operable to project images onto a user-selected display surface spaced a distance from the portable communication device, the method comprising:

receiving an input indicating a request to use the projector to perform a projection task, the projection task including projecting at least one image from a stored image file onto the user-selected display surface;

responsive to the request, retrieving content metadata for the stored image file;

determining, based at least on the content metadata, whether the power source has sufficient power remaining to enable the projector to complete the projection task;

in the event that the power source is determined to not have sufficient power remaining to enable the projector to complete the projection task, modifying at least one of parameters associated with the projection task and functionality of the portable communication device to increase a likelihood that the power source will be able to supply sufficient power to the projector to complete the projection task;

determining whether modifying at least one of parameters associated with the projection task and functionality of the portable communication device will enable the power source to supply sufficient power to the projector to complete the projection task; and in the event that modifying at least one of parameters associated with the projection task and functionality of the portable communication device will not enable the power source to supply sufficient power to the projector to complete the projection task, searching for another portable communication device to which to communicate the stored image file for projected display.

2. The method of claim 1, wherein the step of determining whether the power source has sufficient power remaining to complete the projection task comprises:

estimating, based at least on the content metadata, an amount of power required from the power source for the projector to complete the projection task;

estimating, based at least on the content metadata, an amount of time required for the projector to complete the projection task;

estimating an amount of operating time remaining for the power source taking into account the estimated amount of power required for the projector to complete the projection task; and comparing the estimated amount of time required for the projector to complete the projection task to the estimated amount of operating time remaining for the power source.

3. The method claim 1, wherein the step of receiving an input comprises receiving a request to execute a software application that controls operation of the projector.

4. The method of claim 1, wherein the step of modifying at least one of parameters associated with the projection task and functionality of the portable electronic device comprises:

modifying at least one of parameters associated with the projection task and functionality of the portable electronic device based on stored context data relating to operation of the projector.

5. The method of claim 1, wherein the step of modifying at least one of parameters associated with the projection task and functionality of the portable electronic device comprises:

reducing at least one of a laser scanning speed of the projector, resolution of displayed images, brightness of displayed images, contrast of displayed images, size of displayed images, and a quantity of colors used in displayed images.

6. The method of claim 1, wherein the portable electronic device is a portable communication device and wherein the step of modifying at least one of parameters associated with the projection task and functionality of the portable electronic device comprises:
  deactivating at least one of the following functional features of the portable communication device: short-range wireless communication functionality, Internet access functionality, keypad lighting, display lightning and location-related functionality.

7. The method of claim 1, further comprising:
  storing information related to which parameters of the projection task and which functionality of the portable electronic device was modified to produce projector-related, power-saving history information.

8. The method of claim 7, further comprising:
  receiving a second input indicating a second request to use the projector to perform a second projection task, the second projection task including projecting at lease one image from a second stored image file onto a second user-selected display surface;
  responsive to the second request, retrieving second content metadata from the second stored image file;
  projecting, based at lease one the second content metadata, whether the power source has sufficient power remaining to enable the projector to complete the second projection task; and
  in the event that the power source is projected to not have sufficient power remaining to enable the projector to complete the second projection task, modifying at least one of parameters associated with the second projection task and functionality of the portable electronic device based at least on the projector-related, power-saving history information to increase a likelihood that the power source will be able to supply sufficient power to the projector to complete the second projection task.

9. The method of claim 1, further comprising:
  determining whether the other portable communication device has sufficient power to enable the projector to complete the projection task; and
  in the event that the other portable communication device has sufficient power to enable the projector to complete the projection task, transmitting the stored image file to the other portable communication device.

10. The method claim 1, further comprising:
  prior to modifying at least one of parameters associated with the projection task and functionality of the portable electronic device, displaying proposed modifications to at least one of parameters associated with the projection task and functionality of the portable electronic device to a user of the portable electronic device, the proposed modifications corresponding to a power management policy stored in a memory of the portable electronic device;
  receiving a second input indicating whether the user accepts the proposed modifications; and
  updating the power management policy based on the second user input.

11. The method of claim 10, wherein the step of modifying at least one of parameters associated with the projection task and functionality of the portable electronic device comprises:
  in the event that the second input indicates that the user accepts the proposed modifications, modifying at least one of parameters associated with the projection task and functionality of the portable electronic device in accordance with the proposed modifications.

12. A portable electronic device that supports operation of a projector, the projector being operable to project images onto a user-selected display surface spaced a distance from the portable electronic device, the portable electronic device comprising:
  a power source;
  a memory, coupled to the power source, operable to store an image file and associated content metadata;
  a user interface coupled to the power source, the user interface operable to receive a user input indicating a request to use the projector to perform a projection task, the projection task including projecting at least one image from the image file onto the user-selected display surface;
  a transmitter coupled to the power source; and
  a processor coupled to the power source, the user interface, the transmitter and the memory, the processor being operable to:
    retrieve, from the memory, the content metadata for the image file responsive to the user input;
    determine, based at least on the content metadata, whether the power source has sufficient power remaining to enable the projector to complete the projection task;
    in the event that the power source is determined to not have sufficient power remaining to enable the projector to complete the projection task, modify at least one of parameters associated with the projection task and functionality of the portable electronic device to increase a likelihood that the power source will be able to supply sufficient power to the projector to complete the projection task;
    determine whether modifying at least one of parameters associated with the projection task and functionality of the portable electronic device will enable the power source to supply sufficient power to the projector to complete the projection task;
    in the event that modifying at least one of parameters associated with the projection task and functionality of the portable electronic device will not enable the portable power source to supply sufficient power to the projector to complete the projection task, search for another portable electronic device to which to communicate the image file for projected display;
    determine whether the other portable electronic device has sufficient power to complete the projection task; and
    in the event that the other portable electronic device has sufficient power to complete the projection task, transmit the image file to the other portable electronic device via the transmitter.

13. The portable electronic device of claim 12, wherein the processor is further operable to:
  estimate, based at least on the content metadata, an amount of power required from the power source for the projector to complete the projection task;
  estimate, based at least on the content metadata, an amount of time required for the projector to complete the projection task;
  estimate an amount of operating time remaining for the power source taking into account the estimated amount of power required for the projector to complete the projection task; and
  compare the estimated amount of time required for the projector to complete the projection task to the estimated amount of operating time remaining for the power source to project whether the power source has sufficient power remaining to enable the projector to complete the projection task.

14. The portable electronic device of claim 12, further comprising the projector, wherein the projector is coupled to the power source and the processor, and wherein the memory is further operable to store an application that, when executed by the processor, enables the processor to control operation of the projector.

15. The portable electronic device of claim 12, wherein the portable electronic device is a wireless communication device and wherein the power source is a rechargeable battery.

16. The portable electronic device of claim 12, wherein the memory is further operable to store context data relating to operation of the projector and wherein the processor is further operable to modify at least one of parameters associated with the projection task and functionality of the portable electronic device based on the context data.

17. The portable electronic device of claim 16, wherein the context data includes at least one of user preferences, history of prior modifications to at least one of parameters associated with the projection task and functionality of the portable electronic device, a power management policy for the portable electronic device, time of day, day of the week, day of the year, location of the portable electronic device, and brightness in an area in which the projector is intended to operate.

18. A method of operation of a portable electronic device, the portable electronic device receiving power from an accompanying power source and supporting operation of a projector, the projector being operable to project images onto a user-selected display surface spaced a distance from the portable electronic device, the method comprising:
   receiving a power availability query from another portable electronic device, the power availability query requesting information on an available capacity of the power source;
   estimating the available capacity of the power source responsive to the power availability query;
   transmitting a power availability message to the other portable electronic device, the power availability message including information regarding the estimated available capacity of the power source;
   receiving, from the other portable electronic device, a request to accept transfer of an image file for display by the projector responsive to the power availability message; and
   transmitting an image transfer response message to the other portable electronic device, the image transfer response message indicating whether the portable electronic device will accept transfer of the image file to facilitate projection by the projector.

19. A method of operation of a system that includes at least a first portable electronic device and a second portable electronic device, the first portable electronic device receiving power from a first power source, the second portable electronic device receiving power from a second power source, each of the first portable electronic device and the second portable electronic device supporting operation of at least one projector, the at least one projector being operable to project images onto a user-selected display surface spaced a distance from at least one of the first portable electronic device and the second portable electronic device, the method comprising:
   receiving, at the first portable electronic device, a user input indicating a request to use the at least one projector to perform a projection task, the projection task including projecting at least one image from a stored image file onto the user-selected display surface;
   responsive to the request, retrieving, by the first portable electronic device, content metadata for the stored image file;
   determining, by the first portable electronic device and based at least on the content metadata, whether the first power source has sufficient power remaining to enable the at least one projector to complete the projection task;
   in the event that the first power source is determined to not have sufficient power remaining to enable the at least one projector to complete the projection task, determining, by the first portable electronic device, whether modifying at least one of parameters associated with the projection task and functionality of the first portable electronic device will enable the first power source to supply sufficient power to the at least one projector to complete the projection task;
   in the event that modifying at least one of parameters associated with the projection task and functionality of the first portable electronic device will not enable the first power source to supply sufficient power to the at least one projector to complete the projection task, transmitting, by the first portable electronic device, a power availability query to the second portable electronic device, the power availability query requesting information regarding an available capacity of the second power source;
   receiving, by the second portable electronic device, the power availability query;
   determining, by the second portable electronic device, the available capacity of the second power source responsive to the power availability query;
   transmitting, by the second portable electronic device, a power availability message to the first portable electronic device, the power availability message including information regarding the available capacity of the second power source;
   determining, by the first portable electronic device, whether the second power source has sufficient power capacity to complete the projection task;
   in the event that the second power source has sufficient power capacity to complete the projection task, transmitting, by the first portable electronic device, a request to accept transfer of the stored image file for display by the at least one projector;
   receiving, by the second portable electronic device, the request to accept transfer of the stored image file;
   transmitting, by the second portable electronic device, an image transfer response message responsive to the request to accept transfer of the stored image file, the image transfer response message indicating whether the second portable electronic device will accept transfer of the stored image file to facilitate projection by the at least one projector; and
   transmitting, by the first portable electronic device, the stored image file to the second portable electronic device in the event that the image transfer response message indicates that the second portable electronic device will accept transfer of the stored image file.

20. A portable electronic device that supports operation of a projector, the projector being operable to project images onto a user-selected display surface spaced a distance from the portable electronic device, the portable electronic device comprising:
   a power source;
   a memory, coupled to the power source, operable to store an image file and associated content metadata;

a user interface coupled to the power source, the user interface operable to receive an input indicating a request to use the projector to perform a projection task, the projection task including projecting at least one image from the image file onto the user-selected display surface;

a transmitter coupled to the power source; and a processor coupled to the power source, the user interface, the transmitter and the memory, the processor being operable to:

retrieve, from the memory, the content metadata for the image file responsive to the user input;

determine, based at least on the content metadata, whether the power source has sufficient power remaining to enable the projector to complete the projection task;

in the event that the power source is determined to not have sufficient power remaining to enable the projector to complete the projection task, determine whether modifying at least one of parameters associated with the projection task and functionality of the portable electronic device will enable the power source to supply sufficient power to the projector to complete the projection task;

in the event that modifying at least one of parameters associated with the projection task and functionality of the portable electronic device will not enable the portable power source to supply sufficient power to the projector to complete the projection task, search for another portable electronic device to which to communicate the image file for projected display;

determine whether the other portable electronic device has sufficient power to complete the projection task; and in the event that the other portable electronic device has sufficient power to complete the projection task, transmit the image file to the other portable electronic device via the transmitter.

* * * * *